United States Patent [19]

Instance

[11] Patent Number: 4,504,348

[45] Date of Patent: Mar. 12, 1985

[54] METHOD OF MAKING LABELS FOR CONTAINERS

[76] Inventor: David J. Instance, Past Heap Farm, Pembury, Tunbridge Wells, Kent, England

[21] Appl. No.: 560,796

[22] Filed: Dec. 13, 1983

[30] Foreign Application Priority Data

Dec. 13, 1982 [GB] United Kingdom ............... 8235424

[51] Int. Cl.³ ............................................ B32B 31/18
[52] U.S. Cl. .................................. 156/251; 156/259; 156/260; 156/267; 156/271
[58] Field of Search ............... 156/251, 256, 259, 260, 156/264, 271, 244.14, 244.16, 244.18, 277, 515, 85, 86

[56] References Cited

U.S. PATENT DOCUMENTS

| | | | |
|---|---|---|---|
| 2,990,875 | 7/1961 | Samuels et al. | 156/251 |
| 3,524,783 | 8/1970 | Sutherland | 156/251 |
| 3,558,406 | 1/1971 | Kugler | 156/515 |
| 3,843,485 | 10/1974 | Doll et al. | 156/271 |
| 4,415,392 | 11/1983 | Komori | 156/244.14 |
| 4,425,390 | 1/1984 | Changani et al. | 156/85 |
| 4,439,260 | 3/1984 | Canterino et al. | 156/244.14 |

*Primary Examiner*—Caleb Weston
*Attorney, Agent, or Firm*—Birch, Stewart, Kolasch & Birch

[57] ABSTRACT

A method of continuously producing a series of tubular labelling sleeves, which method comprises (a) printing on each of the upper and lower outer faces of a flat tube or resilient material a sequence of desired images, the image on the upper face of the flat tube being printed in register with the image on the lower face of the flat tube; (b) removing the longitudinal edge portions of the flat tube from each of the two sides of the tube; (c) forming at regular intervals a seal across the width of the resilient material so as to seal together the upper and lower sides of the tube, steps (b) and (c) being performed in either order; and (d) severing the tube across its width along the resultant seal thereby to form a tubular sleeve.

8 Claims, 1 Drawing Figure

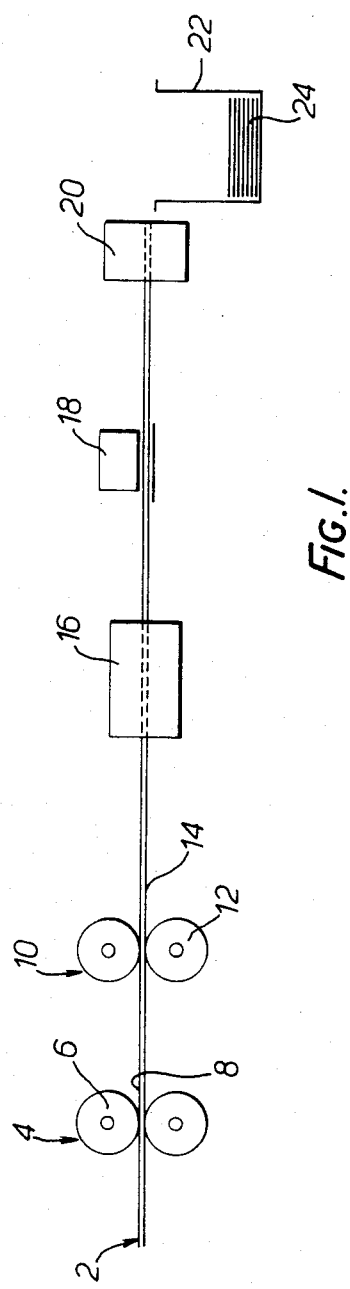

METHOD OF MAKING LABELS FOR CONTAINERS

BACKGROUND OF THE INVENTION

The present invention relates to labels for containers, more particularly to a method of producing tubular labelling sleeves suitable for application to the exterior of containers.

It is known to apply plastics labelling sleeves to containers which have means to retain such sleeves in place. Suitably the sleeves are retained in position by means of two axially-spaced, outwardly directed, peripheral beads on the container. Such labelling sleeves are extremely useful in providing greater flexibility when filling containers. They also play an important role in reducing the amount of pre-filled containers that need to be stockpiled by a supplier of materials such as chemicals. Thus, for example, the use of such labelling sleeves enables the use of standard sized containers for a wide variety of different materials such as chemicals of various types, e.g. agrochemicals, pesticides, fungicides, industrial chemicals, dyestuffs. Accurate labelling of these materials, which are of widely differing properties, is essential; by the use of such labelling sleeves, full and accurate details concerning a wide variety of materials can be printed onto labels which are then stored until required for use. On receiving an order for a particular chemical, the requisite number of standard sized containers is filled with the desired chemical and the appropriate tubular sleeve label is applied to each container. An example of such a container and sleeve is described in U.K. Pat. No. 1406234.

BRIEF SUMMARY OF THE INVENTION

According to the present invention there is provided a method of producing such tubular sleeve labels in continuous and efficient manner. According to the present invention there is provided a method of continuously producing a series of tubular labelling sleeves, which method comprises (a) printing on each of the upper and lower outer faces of a flat tube of resilient material a sequence of desired images, the image on the upper face of the flat tube being printed in register with the image on the lower face of the flat tube; (b) removing the longitudinal edge portions of the flat tube from each of the two sides of the tube; (c) forming at regular intervals a seal across the width of the resilient material so as to seal together the upper and lower sides of the tube, steps (b) and (c) being performed in either order; and (d) severing the tube across its width along the resultant seal thereby to form a tubular sleeve.

Preferably the said resilient material is a plastics material, typically a low density polyethylene.

Typically the seals across the resilient material are formed by heat sealing.

BRIEF DESCRIPTION OF THE DRAWING

The present invention will now be described, by way of example only, with reference to the accompanying drawing which illustrates diagrammatically apparatus for performing the method of the present invention.

DETAILED DESCRIPTION

Referring to the drawing, a flat tube 2 of resilient plastics material, suitably of low density polyethylene, 70 thick, is passed through a first printing station 4 where information which is to be displayed on one half of the label is printed from a first printing roller 6 on to the upper face 8 of the tube, and then the tube is passed through a second printing station 10 where information which is to be displayed on the other half of the label is printed from a second printing roller 12 on to the lower face 14 of the tube, the image printed on the lower face of the tube being printed in register with the image on the upper face of the tube. Downstream of the second printing station at 16, the longitudinal edge portions of the tube are removed, typically by use of a die cutting tool, from each of the two sides of the tube to give a separate upper layer and lower layer which are subsequently sealed together across their width at regular intervals. Suitably the upper and lower webs are sealed by a heat-sealing means 18 located downstream of the cutting means 16. Finally, each label is severed from its neighbour by cutting along the length of the heat-seal, the sealing of the webs and the subsequent cutting through the seal being arranged so that the webs on either side of the cut remain sealed together substantially across the width of the tube. The resultant tubular labelling sleeves 24 are collected at 22 and stored for subsequent use.

In an alternative arrangement, instead of performing the step of heat-sealing of the two layers and the step of severing of the heat seal along its length as two operations, one after the other, the two said steps are performed simultaneously as one operation. Thus the upper and lower layers are heat-sealed and at the same time the heat seal which is formed is severed along its length.

I claim:

1. A method of continuously producing a series of tubular labelling sleeves, which method comprises (a) printing on each of the upper and lower outer faces of a flat tube of resilient material a sequence of desired images, the image on the upper face of the flat tube being printed in register with the image on the lower face of the flat tube; (b) removing the longitudinal edge portions of the flat tube from each of the two sides of the tube; (c) forming at regular intervals a seal across the width of the resilient material so as to seal together the upper and lower sides of the tube, steps (b) and (c) being performed in either order; and (d) severing the tube across its width along the resultant seal thereby to form a tubular sleeve.

2. A method as claimed in claim 1, wherein the said resilient material is a plastics material.

3. A method as claimed in claim 2, wherein the plastics material is a low density polyethylene.

4. A method as claimed in claim 1, wherein the seals across the resilient material are formed by heat sealing.

5. A method of continuously producing a series of tubular labelling sleeves, which method comprises (a) printing on each of the upper and lower outer faces of a flat tube of resilient material a sequence of desired images, the image on the upper face of the flat tube being printed in register with the image on the lower face of the flat tube; (b) removing the longitudinal edge portions of the flat tube from each of the two sides of the tube; and (c) forming at regular intervals a seal across the width of the resilient material so as to seal together the upper and lower sides of the tube, and during the sealing step (c) severing the tube across its width along the resultant seal thereby to form a tubular sleeve.

6. A method as claimed in claim 5, wherein the said resilient material is a plastics material.

7. A method as claimed in claim 6, wherein the plastics material is a low density polyethylene.

8. A method as claimed in claim 5, wherein the seals across the resilient material are formed by heat sealing.

* * * * *